March 30, 1937. J. B. KIRBY Re. 20,313

CLOTHES WASHING MACHINE

Original Filed Jan. 28, 1929

INVENTOR
JAMES B. KIRBY
BY Edmund J. De Pas
his ATTORNEY

Reissued Mar. 30, 1937 Re. 20,313

UNITED STATES PATENT OFFICE 20,313

CLOTHES WASHING MACHINE

James B. Kirby, West Richfield, Ohio, assignor, by mesne assignments, to The Apex Electrical Manufacturing Company, Cleveland, Ohio, a corporation of Ohio, trustee Original No. 1,834,492, dated December 1, 1931, Serial No. 335,491, January 28, 1929. Application for reissue September 18, 1933, Serial No. 690,035

42 Claims. (Cl. 259—101)

Figure 1:
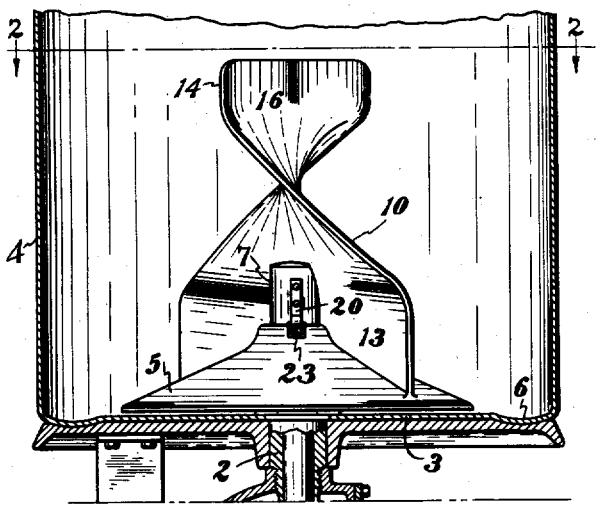

This invention relates to clothes washing machines and has particular reference to the agitator or dasher therein.

One object of the invention is to provide an oscillatable agitator in the general form of either a cone-shaped or disk-like body with a curved upwardly extending blade or blades thereon so constructed and arranged that it will cause the fluid in the vat to circulate in various paths with a high degree of turbulence and also circumferentially around the tub in one general circulatory direction responsive to the operation of the agitator, the velocity of such circumferential circulation however, being intermittently retarded or caused to hesitate during spaced substantially uniform intervals, while at the same time a partial vacuum or substantial suction effect is produced between the curved blades, whereby the clothes, more or less, piece by piece are drawn into the space adjacent to the blades and are sucked inwardly and are flexed and worked in the washing fluid in much the same manner as they might be washed by hand.

A further object of the invention is to provide apparatus for washing clothes, the operation of which consists in actuating or moving a washing fluid in a vat containing clothes to be washed in such a manner that it circulates continuously around the tub in one general circulatory direction accompanied by an intermittent alternate retardation period during which the clothes are drawn or sucked by a partial vacuum inwardly towards the center of the vat with the distinct tendency to pull out and separate each article from adjacent articles so that they move piece by piece into the suction area and they are thus subjected to an individual washing action which operates to thoroughly cleanse the individual articles being washed without tangling of the individual pieces with respect to themselves or with respect to each other. The flexing and working action of the agitator often turns the pockets and sleeves of garments inside-out and the separating action is such so that at the completion or during any period of the washing operation the clothes in the tub can be readily removed piece-by-piece. The separating action of the agitator is of such nature that it will untie knots in apron strings and the like which have been tied in such strings prior to their being washed.

The velocity of the circulatory movement of the washing fluid and the clothes varies somewhat dependent upon the load or amount of clothes in a vat of predetermined size containing a predetermined amount of washing fluid. With a predetermined quantity of washing fluid and a small load of clothes, the velocity of the washing fluid and clothes around the vat is relatively rapid. On the other hand, with the same quantity of washing fluid and a comparatively large or heavy load of clothes, the circulatory movement of the washing fluid is comparatively slower. In other words, the speed of the circulation of the washing fluid and the clothes is dependent upon the amount of washing fluid in the vat as compared with the load of clothes.

Other objects of the invention are the provision of a simple agitator which shall produce a high degree of agitation of the liquid and fabric contents of the tub or casing, thereby removing foreign matter quickly and thoroughly from the fabrics, and distributing such fabrics rapidly and uniformly throughout the tub or casing; the provision of an agitator or dasher which shall operate rapidly and efficiently on the clothing but without danger of tangling or injuring the same; the provision of an agitator transmitting to the tub contents a type of motion having a vertical thrust; while further objects and advantages of the invention will become apparent as the description proceeds.

Figure 3:
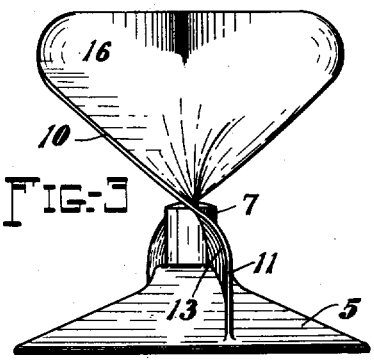
Figure 4:
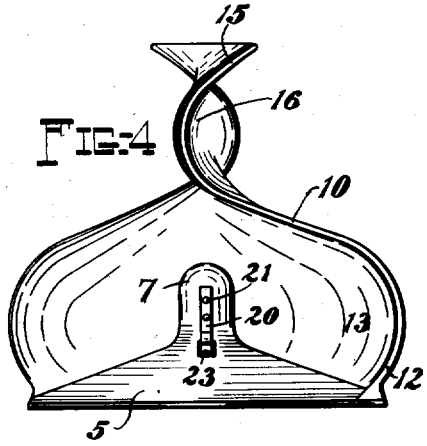
Figure 2:
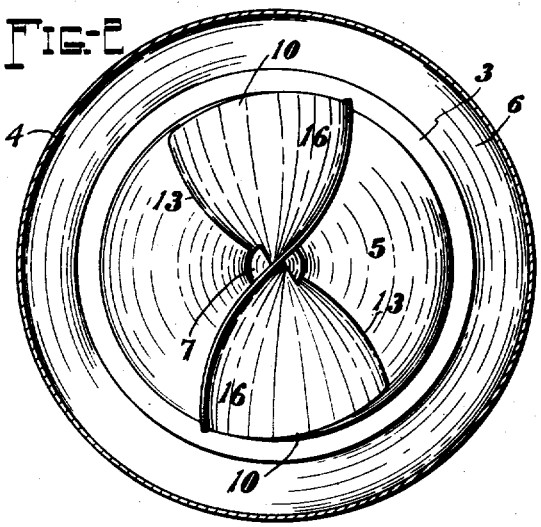

In the drawing accompanying and forming a part of this application I have shown certain illustrative embodiments of my invention, both separately and in operative position in a specimen form of tub or casing. In the drawing Fig. 1 is a vertical sectional view through a washing machine showing one of my improved agitators in side elevation; Fig. 2 is a sectional view corresponding to the line 2—2 of Fig. 1 and showing my improved dasher in plan; Fig. 3 is a side elevation of the dasher viewed from a different angle from that in Fig. 1; Fig. 4 is a side elevation and Fig. 5 a top plan view of a modified form of dasher; Fig. 6 is a side elevation of another modification; Fig. 7 is a detail view showing one mode of locking the dasher to the operating shaft; and Fig. 7[a] shows a slightly modified detail of latch.

My improved agitator is of the well-known oscillatory type adapted to be applied to the top of a vertical shaft 1 which is journaled in a suitable bearing sleeve 2 mounted in the bottom 3 of a liquid containing tub or casing 4. Preferably this agitator is formed at its lower end with a circular disk or conical body portion 5, either conical as shown in Figs. 1 to 5 inclusive or flat as shown at 5[a] in Fig. 6, and the tub bottom may well be formed outside of this disk with an annular depression 6 adapted to receive buttons, pins, marbles, gravel, and other accidental articles sometimes found in clothing. Any suitable means may be provided for oscillating the agitator, as for example, a pinion 1[a] fixed to the shaft 1 and a reciprocating rack bar 1[b] meshing therewith and driven by a suitable power source (not shown).

The agitator is also formed with a socket 7 opening from below as shown in Fig. 7 and adapted for attachment to the shaft 1, the preferable mode being to provide the shaft with a suitable fluted or channeled head 8 whereby the dasher is positively driven and supported. Except for the depression 8 the above described construction is common in washing machines, and said channel is itself illustrated and claimed in my patent application Serial No. 281,455, filed May 29, 1928 which matured on December 31, 1929 into Patent No. 1,741,317.

Rising from the upper surface of the disk 5 is a free-standing blade having at least a part thereof approximately helicoid in shape, that is to say: the outer margin 10 of the blade is inclined obliquely relative to the socket-axis, substantially after the manner of a helix, while the middle of the blade substantially contains the axis of the socket so that the blade comprises at least upon one side of the axis as shown in Fig. 6, and preferably upon both sides of the axis as shown in the other views, a free-standing curved or slanting portion, both faces of which are exposed directly to liquid contact and exhibit a washing function.

In order to prevent the formation of an unduly narrow and pointed pocket at the point of intersection of blade and disk, the direction of the blade margin is preferably changed adjacent to the disk as shown at 11 in Figs. 1 and 3 and at 12 in Fig. 4, so as to produce a comparatively wide and shallow pocket, adapted during the rotation of the agitator in one direction to catch the liquid and propel it vigorously in the direction of rotation; and for the purpose of enhancing this pocketing, the surface of the blade is preferably cupped at this point as indicated at 13.

Likewise at its upper end, the blade, instead of being continued along the slant defined by the helicoid portion 10 has its margin turned either straight upwardly as shown at 14 in Fig. 1, or even retroverted as shown at 15 in Fig. 4, so as in effect to define a second pocket 16 facing in the opposite direction than the pocket 13 but at a higher level. In order to emphasize the liquid-propelling effect of the pocket 16, the blade is preferably curved horizontally at this point in a direction opposite to the direction of curvature at the level of the pockets 13.

Accordingly the preferred form of blade exhibits an ogee curve in horizontal section at the level of the pockets 13, a reversed ogee curve in horizontal section at the higher level of the pockets 16, and a series of curves of intermediate curvature at horizontal sections intermediate therebetween; and it is particularly in this intermediate section that the margins of the blade are so slanted as to exhibit an approximate helicoid configuration and a substantial propeller action in a vertical direction.

Figure 5:
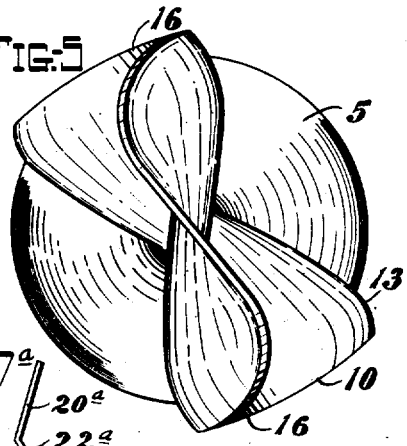
Figure 6:
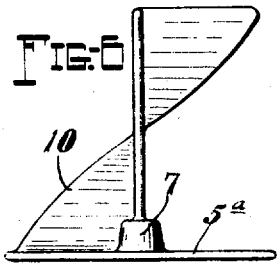
Figure 7:
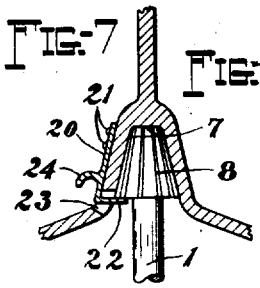
Figure 7A:
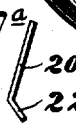

Substantially the only difference between the device shown in Figs. 1 to 3, and that shown in Figs. 4 and 5, is that the latter device exhibits more pronounced curvatures; while that in Figure 6 exhibits a lop-sided blade, and more uniform curvature.

In use this dasher is vigorously oscillated about a vertical axis. During that part of the stroke which is clockwise in direction, the pockets 13 catch the liquid and propel it horizontally with considerable force, the helicoid portion of the blade meanwhile drawing the liquid powerfully downward; during the counterclockwise part of the stroke the pockets 16 catch and propel the liquid at the higher level powerfully in the opposite direction from the pockets 13, and also the helicoid portions of the blade thrust the tub-contents powerfully upward.

The result is a very rapid and thorough mixing and agitation of the entire contents of the tub which results in an efficient washing of the fabrics therein. A further advantage of the device is that this washing action is largely independent of the depth of liquid or the amount of clothing in the tub. While I consider the optimum condition to be that wherein the liquid level approximately coincides with the top of the blade, still a considerable variation from this level in either direction is permissible.

So vigorous is the propeller action as actually to lift the agitator off the shaft unless it is either made very heavy or else tightly secured thereto; and to effect such securement I preferably provide the exterior of the socket-boss 7 with a latch consisting of a spring-shank 20 fastened at its upper end as shown at 21 and having at its lower end a hooked nose 22 projecting through an aperture 23 in such wise as to engage the lower edge of the head 8. I have shown the hook as also provided with a lug 24 by which it can be released; or the hook 20[a] can be formed with a slanting end 22[a] as shown in Fig. 7[a], which will become disengaged upon a predetermined degree of vertical pull greater than that produced by the propeller action alone.

The curved blade projecting from the surface of the cone is inclined with respect to a line normal to the surface of the cone of the agitator. This angle of inclination may be uniform throughout the length of the helicoid portion of the blade, but preferably decreases from the lower helicoid portion of the blade toward the lower end thereof. This inclination of the blade with respect to a line normal to the cone surface of the body portion of the agitator forms a pocket upon one side at the bottom of the blade as indicated at 13 and in a similar manner the reverse pocket 16 is formed at the top of the blade.

When the agitator moves in one direction, the cupped arrangement of the blades permits portions of the blades to move with less resistance through the washing fluid than they do upon reverse movement thereof thus inducing a circulatory movement of fluid around the tub. However, the alternate movement of the agitator tends to a certain extent, to momentarily retard the flow of the circulatory fluid around the vat. Although the agitator determines and causes the flow of the fluid around the vat without equal reverse movement thereof, the weight or quantity of clothes being washed in the apparatus determines the extent to which the flow is retarded by the retarding movement of the agitator and it is possible by placing heavy loads of clothes in the machine, to retard momentarily the flow of the washing fluid in one direction to such extent that a seaming hesitation takes place in such flow.

When the agitator is moved in one direction a vacuum effect is produced in the space in which the blade or blades of the agitator operate. This vacuum effect is of sufficient extent so as to suck portions of the clothes adjacent the edge of the agitator into such space. This continues until the dolly reverses and moves in an opposite direction whereupon the clothes and the water are given a reverse acceleration. Upon reverse movement, the agitator again slips through the water and the clothes, and the suction thereupon acts again to draw the same or another piece of cloth into the zone of action of the agitator.

The alternate repulsion and suction of the vanes of the agitator work and flex the individual pieces of laundry back and forth against the surfaces of the vanes and due to the circulatory flow of fluid in the tub such article eventually moves to a position where it is temporarily not affected by this action of the blade and as such article moves away from the zone of action it is replaced by another article on which the cycle of operation just described is repeated.

I have shown the blade as exhibiting substantially the same horizontal width from top to bottom, but this detail is of course subject to much variation, as is also the curvature of different parts. It will also be understood that certain of the features herein described are capable of independent use, or of consolidation with other features not herein shown; as for example that the helicoid portion of the blade can be used without pockets, or the pockets without the helicoid portion or either with auxiliary features not herein shown.

It should also be understood that the water level of the tub can be varied over rather wide limits which results in marked changes in the movement of the water. The use of the different forms of agitators shown and the use of the modifications suggested would also tend to greatly vary the water action in the tub without however departing from the distinctive mode of operation which involves the circulating of the clothes and washing fluid circumferentially about the tub and the selective and progressive washing action on individual or successive pieces of laundry.

Due to the peculiar configuration of the blades or vanes of the various agitators disclosed herein the upper surface of the liquid at the central region of the tub can be observed to be alternately raised and lowered during the operation of the agitator whereby the effectiveness of the washing action is still further increased due to the alternate reversal of the movement of the liquid and articles being washed.

Accordingly I do not limit myself to the details illustrated and described except as the same are specifically recited in my several claims which I desire may be construed broadly each independently of limitations contained in other claims.

Having thus described my invention what I claim is:

1. An agitator for clothes washing machines having a disk, an attachment for an upright shaft and a blade rising from said disk having at least a part approximately helicoid in shape with the helicoid axis substantially coinciding with the socket axis, and said blade or vane having upper and lower washing surfaces.

2. In a clothes washing machine, a tub for clothes and washing fluid, an agitator in said tub comprising a helicoid blade exposed on both faces to the fluid and clothes and a circular base rigid therewith, and means for driving said agitator with a reversely rotary movement.

3. In a clothes washing machine, a tub, an agitator located centrally of the tub with its outer margins spaced inwardly a substantial distance from the tub side walls and defining a space for the washing of clothes, said agitator comprising a body and an upright blade projecting therefrom and having at least a part of the blade winding about the axis of the agitator and exposed on both faces, to the clothes which are being washed, and means for driving said agitator with a reversely rotary movement.

4. An agitator for clothes washing machines comprising a horizontal circular disk and an upright blade rising therefrom, the center of said blade coinciding substantially with the axis of said disk and its lateral margins conforming substantially at least in part with two similar helices.

5. An agitator comprising a circular disk and a blade rising therefrom whose center substantially includes the axis of said disk and whose margin defines a line which is in part oblique to said axis whereby a slanting portion is produced which gives rise to vertical currents as the agitator is oscillated.

6. An agitator for clothes washing machines having an upright blade formed at different elevations with oppositely facing pockets for circulating the washing liquid at such levels in opposite directions as the agitator is oscillated.

7. An agitator for clothes washing machines having oppositely cupped portions fixedly mounted at different levels adapted upon oscillation about the vertical axis to move the liquid in opposite directions.

8. An agitator for clothes washing machines having a circular disk and a free-standing vertical blade whose lateral margins progress spirally about the axis of oscillation, and a driving attachment on the opposite side of the disk.

9. An agitator having a horizontal disk and a thin blade rising therefrom, the vertical margins of said blade defining a sinuous line and the center of the blade a substantially straight line.

10. An agitator for clothes washing machines having an upright blade symmetrical about the axis of motion having at opposite sides of the axis and upon opposite faces of the blade two oppositely facing pockets and also having at a greater distance along the axis two other pockets opposite to each other and to said first pockets.

11. An agitator for clothes washing machines comprising a circular disk and an upstanding blade carried thereby having oppositely facing reversely slanted portions at different vertical levels.

12. An agitator for clothes washing machines comprising a circular disk and an upstanding blade having oppositely facing pockets located at different vertical levels.

13. An agitator for clothes washing machines comprising a generally upright blade symmetrically disposed about a vertical axis and having liquid propelling pockets located upon opposite sides of said axis and oppositely disposed with respect to each other and also having slanting portions at a different level from said pockets.

14. An agitator for clothes washing machines comprising a generally upright blade symmetrically disposed about a vertical axis and having liquid propelling pockets located in pairs and arranged both side by side and one above the other, each pocket being turned oppositely to its neighbor in each direction.

15. In a clothes washing machine, a tub for fluid and clothes, an agitator in said tub characterized by the possession of an upstanding blade, the upper and lower margins of which are angularly disposed with respect to each other in their respective horizontal planes, and means for driving said agitator with a reversely rotary movement.

16. An agitator for clothes washing machines characterized by the possession of an upright helicoid blade having a washing surface on each face, a socket for a driving shaft, and means for securing said agitator to said shaft against the vertical pull of the blade.

17. An agitator for clothes washing machines comprising a blade having an ogee curve in horizontal section at one level and a reversed ogee curve in horizontal section at a different level.

18. An agitator for clothes washing machines comprising a blade having an ogee curve in horizontal section at one level and a reversed ogee curve in horizontal section at a different level, the horizontal section at an intermediate level being substantially straight, and the surface of the blade at such intermediate level being substantially helicoid on both faces.

19. An agitator for clothes washing machines constructed to be driven through the tub bottom and comprising a circular disk adapted to overlie closely a part only of the tub bottom, and a helicoid blade exposed on both faces and rising from the top face of said disk.

20. In a clothes washing machine, a tub for fluid and clothes, an agitator in said tub comprising a helicoid vane terminating in a circular base, and means for driving said agitator with a reversely rotary movement.

21. In an agitating device, the combination of a receptacle, a shaft projecting into the receptacle, means for imparting alternating rotary movement to the shaft relative to the receptacle, a sleeve secured to said shaft and having a vane secured thereto and disposed radially with respect to the axis of the sleeve, said vane having a sinuous curvature longitudinally of said axis.

22. An agitating element comprising a body portion adapted to be rotatably mounted and a vane secured to said body portion and disposed radially with reference to the axis of rotation, said vane having a sinuous curvature along the length of its axis.

23. In a clothes washing machine, a tub for fluid and clothes, an agitating element comprising a body portion adapted to be mounted for rotation in said tub and a vane projecting from the face of the body portion and disposed radially with reference to the axis of rotation, said vane having a portion which is bowed with its convexity disposed in one direction of its rotation, whereby there is a tendency to create a vacuum in the rear of the vane when the agitator is rotated in the direction in which the concave side of the vane faces, and means for driving said agitator with a reversely rotary movement.

24. In a clothes washing machine, the combination of a receptacle having a bottom and sides, a shaft projecting through said bottom into said receptacle, means for imparting alternating rotary movement to said shaft relative to said receptacle, a circular disk secured to said shaft adjacent to said bottom, and a washing vane rising from the upper surface of said disk to a height at least as great as the diameter of said disk, said vane making an oblique angle with said disk.

25. In a clothes washing machine, the combination of a receptacle having a bottom and sides, a shaft projecting through said bottom into said receptacle, means for imparting alternating rotary movement to said shaft relative to said receptacle, a circular disk secured to said shaft adjacent to said bottom, and a vane rising from the upper surface of said disk having a washing surface oblique to the vertical and terminating at the top in a laterally facing cupped portion.

26. In a clothes washing machine, the combination of a receptacle having a bottom and sides, a shaft projecting through said bottom into said receptacle, means for imparting alternating rotary movement to said shaft relative to said receptacle, a circular disk secured to said shaft adjacent to said bottom, and two symmetrically arranged vanes rising from the upper surface of said disk, each vane having a washing surface which is oblique to the vertical and terminating at its upper end in a laterally facing cupped portion.

27. A washing machine impeller comprising a horizontal disk having a central hub, and a plurality of substantially radial blades having their inner ends joined to said hub, the lower edges of said blades being joined to the upper side of said disk, the outer ends of said blades having integral, inclined wings adapted to create vertical movement of water.

28. A machine for washing clothes comprising a vat, an oscillatable agitator mounted therein, means for oscillating said agitator, said agitator comprising a central portion, and a plurality of blades rigid therewith and inclined in part at least with respect to a normal to said central portion in the same direction and acting to circulate fluid and clothes around said vat in one general circulatory direction during a cycle of operation defined by an oscillation of said agitator.

29. A machine for washing clothes comprising a vat, an oscillatable agitator mounted therein, means for oscillating said agitator, said agitator comprising a central portion having a downwardly and outwardly extending surface, and means on said central portion configurated so as to circulate water and clothes around the vat in one general circulatory direction during a cycle of operation defined by an oscillation of said agitator.

30. A machine for washing clothes comprising a vat adapted to have a normal surface level of cleansing fluid therein, an upstanding oscillatable agitator mounted therein, means for oscillating said agitator, said agitator comprising an upstanding central portion, and means rigid thereon effective substantially from the normal surface level of fluid in the vat to the bottom of the vat, defining paths extending downwardly toward the bottom of the vat and configurated so as to circulate fluid and clothes around the vat in one general circulatory direction responsive to the operation of the agitator.

31. In a machine for washing clothes, a vat for holding clothes and washing fluid, an agitator mounted therein for movement about a vertical axis, and means for oscillating said agitator, said agitator comprising a body part overlying a portion at least of the bottom of the vat and having a blade projecting from the exposed surface of the body part and terminating in a free edge at a distance from such surface and from the sides of the vat whereby there is provided in the vat a free space for the movement of the clothes and washing fluid, said blade being configurated so that upon rotation of the agitator in one direction liquid and clothes in the vat will be given a movement around the vat in one circulatory direction and when the agitator is rotated in a reverse direction liquid and clothes in the vat will be given a movement around the tub in a reverse direction, such movements being of unequal magnitude so that the clothes are advanced around the tub in one general circulatory direction when the agitator is continuously oscillated.

32. A machine for washing clothes comprising a vat, an oscillatable agitator mounted therein, means for oscillating said agitator, said agitator comprising an upstanding central portion, and a plurality of blades extending lengthwise of said portion and a part at least of said blades advancing in the same general direction about the axis of oscillation of said agitator for circulating clothes and fluid in one general direction around the vat.

33. A machine for washing clothes comprising a vat adapted to have a normal surface level of cleansing fluid therein, an oscillatable agitator mounted in said vat, said agitator including a central portion extending substantially to or above the normal surface level of fluid, and a plurality of inclined blades rigid with said central portion and extending downwardly therewith, portions at least of said blades advancing in the same general direction about the axis of oscillation of said agitator and inclined with respect to said central portion in the same general direction and configurated to circulate the clothes in one general circulatory direction around the vat, the space in said vat about said agitator being free of all obstructions which might be effective to prevent the specified circulation from taking place during the operation of the agitator.

34. A machine for washing clothes comprising a vat adapted to have a normal surface level of cleansing fluid therein, an upstanding oscillatable agitator mounted therein, means for oscillating said agitator, said agitator comprising a central portion extending from substantially at least the normal level of cleansing fluid to the bottom of the vat, part at least of said central portion defining a cone-shaped surface, and means on said cone-shaped surface effective substantially from the normal surface level of cleansing fluid to the bottom of the vat and configurated so as to circulate fluid and clothes around the vat in one general circulatory direction responsive to the operation of the agitator.

35. A machine for washing clothes comprising a vat adapted to have a normal surface level of cleansing fluid therein, an oscillatable agitator mounted in said vat, said agitator including a vertically disposed central portion extending substantially to or above the normal surface level of fluid, and a plurality of blades rigid with said central portion and a portion at least of said blades being wound about the same in one general direction, a portion at least of said blades being inclined with respect to the horizontal, the outer edges of said blades being spaced inwardly a substantial distance from the sides of the vat to define a space for the washing of the clothes, and means for oscillating said agitator.

36. In a washing machine, a tub, an agitator therein, the outer extremities of said agitator being spaced inwardly a substantial distance from the side wall of the tub to define a space for the washing of clothes, and means for oscillating said agitator about a fixed axis, said agitator comprising a downwardly and outwardly sloping body portion and a readially extending blade rigid therewith and inclined with respect to the horizontal.

37. In a machine for washing clothes, a vat, an upstanding oscillatable agitator mounted therein, means for oscillating said agitator, said agitator including means configurated so as to circulate fluid and clothes around the vat in one general circulatory direction responsive to the operation of the agitator.

38. A washing machine comprising a vat, an oscillatable agitator mounted therein, means for oscillating said agitator, said agitator including means rigid therewith configurated so as to circulate fluid and clothes around said vat in one general circulatory direction during a cycle of operation defined by an oscillation of said agitator.

39. A machine for washing clothes comprising a vat, an upstanding oscillatable agitator mounted therein, means for oscillating said agitator to define a cycle of operation, said agitator including means configurated so as to circulate fluid and clothes around the vat in one general circulatory direction with an intermittent retardation of said circulation during the cycle of operation.

40. In a clothes washing machine, a tub for fluid and clothes, an agitator mounted in said tub for oscillatory movement about a vertical axis, said agitator comprising a body portion and a plurality of blades extending lengthwise of the axis of the agitator and projecting radially thereof, portions at least of each of said blades being of cupped configuration defining concave surfaces facing in the same general direction around the axis of the agitator, and means for driving said agitator with a reversely rotary movement.

41. In a clothes washing machine, a tub for fluid and clothes, an agitator mounted in said tub for oscillatory movement about a vertical axis, said agitator comprising a body portion and a pair of radially projecting vanes extending lengthwise of the axis of the agitator, a portion at least of each of said blades being concave on one face and convex on the opposite face with the convex sides facing in the same general circular direction, and means for driving said agitator with a reversely rotary movement.

42. In a clothes washing machine, a tub for fluid and clothes, an agitator mounted in said tub for oscillatory movement about a vertical axis, said agitator comprising a body portion and a plurality of vanes extending lengthwise of the axis of the agitator and projecting radially thereof, portions at least of each of said vanes being of cupped configuration defining concave surfaces facing in the same general direction around the axis of the agitator, the specified concave surfaces of said vanes all being located at substantially the same height from the bottom of said tub, and means for driving said agitator with a reversely rotary movement.

JAMES B. KIRBY.